(12) United States Patent
Thompson (10) Patent No.: US 10,971,908 B2
(45) Date of Patent: Apr. 6, 2021

(54) ENCLOSURE FOR PROTECTING ELECTRICAL COMPONENTS, CABLES AND THE LIKE

(71) Applicant: Electrix International Ltd, County Durham (GB)

(72) Inventor: Christopher Thompson, County Durham (GB)

(73) Assignee: Electrix International Ltd

( * ) Notice: Subject to any disclaimer, the term of this patent is extended or adjusted under 35 U.S.C. 154(b) by 0 days.

(21) Appl. No.: 16/158,411

(22) Filed: Oct. 12, 2018

(65) Prior Publication Data

US 2019/0305534 A1 Oct. 3, 2019

(30) Foreign Application Priority Data

Apr. 3, 2018 (GB) ...................................... 1805475

(51) Int. Cl.
*H02G 3/08* (2006.01)
*F16B 37/14* (2006.01)
(Continued)

(52) U.S. Cl.
CPC ............ *H02G 3/081* (2013.01); *F16B 33/004* (2013.01); *F16B 37/145* (2013.01); *H02B 1/28* (2013.01);
(Continued)

(58) Field of Classification Search
CPC ....... F16B 5/0233; F16B 19/02; H02G 3/081; H02G 3/088; H02G 3/10; H02B 1/40; H02B 1/28; H05K 5/0204; H05K 5/0073
(Continued)

(56) References Cited

U.S. PATENT DOCUMENTS 4,108,407 A * 8/1978 Cable ................... F16B 5/0233
248/188.4
2007/0221746 A1 9/2007 Heinrich et al.
(Continued)

FOREIGN PATENT DOCUMENTS

CN 202140648 2/2012
DE 202009012753 2/2011
(Continued)

OTHER PUBLICATIONS

European Search Report for European Application No. EP19153620 dated Aug. 5, 2019.
(Continued)

*Primary Examiner* — Stephen J Castellano
(74) *Attorney, Agent, or Firm* — The Belles Group, P.C.

(57) ABSTRACT

An enclosure for protecting electrical components, cables and the like. The enclosure has a plurality of faces which define a volume with an opening to provide access. One face has apertures for receiving fixing screws to fix the enclosure to a wall or surface. There is a lid to close the opening. Spacer members separate the enclosure from the surface. Each has a bore extending through it and a threaded portion extending from a surface of the face which engages the apertured face of the enclosure. For each spacer there is a cap for covering the aperture and sealing the apertured face. Also provided for each spacer is a retainer for threading onto the externally threaded portions when the spacer's threaded portion extend through the apertured face.

20 Claims, 5 Drawing Sheets

(51) Int. Cl.
  *H02G 3/10* (2006.01)
  *H02B 1/28* (2006.01)
  *F16B 33/00* (2006.01)
  *H02B 1/40* (2006.01)

(52) U.S. Cl.
  CPC ............... *H02B 1/40* (2013.01); *H02G 3/088* (2013.01); *H02G 3/10* (2013.01)

(58) Field of Classification Search
  USPC .............................................. 411/546, 374
  See application file for complete search history.

(56) References Cited

U.S. PATENT DOCUMENTS

| | | |
|---|---|---|
| 2012/0090263 A1 | 4/2012 | Schaefer et al. |
| 2012/0181402 A1 | 7/2012 | Putz et al. |
| 2013/0336743 A1 | 12/2013 | Hill |
| 2017/0346267 A1 | 11/2017 | Wentworth |

FOREIGN PATENT DOCUMENTS

| | | |
|---|---|---|
| EP | 0991155 | 4/2000 |
| FR | 2988148 | 9/2013 |
| WO | WO 02/089280 | 11/2002 |
| WO | WO02/089280 | 11/2002 |
| WO | WO-02089280 A * | 11/2002 |
| WO | 2011045228 | 4/2011 |

OTHER PUBLICATIONS

Corresponding Search Report for GB Application No. 1805475.9, dated Aug. 31, 2018. GB.

* cited by examiner

ENCLOSURE FOR PROTECTING ELECTRICAL COMPONENTS, CABLES AND THE LIKE

CROSS-REFERENCE TO RELATED APPLICATIONS

The application claims priority under 35 U.S.C. § 119 of GB Application No. 1805475.9 filed Apr. 3, 2018. The disclosure of the above application is incorporated herein by reference.

FIELD OF INVENTION

The present invention relates to an enclosure for protecting electrical components, cables and the like and relates particularly, but not exclusively, to a wall mounted enclosure which is spaced from the wall allowing easy access for cleaning the surface onto which the enclosure is mounted.

BACKGROUND

It is commonplace for enclosures to be used to protect electrical components, the cables which connect them as well as the junctions between the components in the cables. Typically, such an enclosure is mounted to a surface, such as a wall, using mounting screws which extend through apertures in the rearmost surface of the enclosure and into the wall. One of the most important protections that the enclosure provides is against water ingress and this is particularly important in environments where cleanliness is a priority. Therefore, the cleaning of the enclosure, and associated components such as conduits and connecting glands, must be an easy and efficient process without risking water entering the enclosure and damaging the components and the like contained therein. To facilitate easy cleaning enclosures are typically formed from stainless steel. The inclusion of the mounting apertures in the rear wall of the enclosure represents a risk of water ingress. As a result, it is not uncommon for a nylon washer to be placed between the fixing screw and the inside of the rear wall of the enclosure to act as a seal. This can be reasonably effective but becomes completely ineffective if the screw becomes loose or is not correctly fixed to the wall to apply sufficient pressure on the washer to create the seal. A loose screw applied no pressure to the washer and therefore does not seal.

For a number of reasons, including easing the cleaning process behind the enclosure, it is commonplace for an enclosure to be mounted on legs thereby separating enclosure from the surface on which it is mounted. This allows easy access onto the mounting surface and also onto the rear surface of the enclosure. These mounting legs are typically stainless steel tubes having an external diameter of perhaps 2 cm and an internal bore of 6 mm this being sufficient to receive the fixing screw which extends through the tube. However, such legs can increase the risk of water ingress by increasing the number of junctions that needs sealing. The junction between each leg and the enclosure and each leg and the wall each represent a potential access point for water. Although nylon washers can be used to seal between the fixing screw and the rear wall of the enclosure the danger of the integrity of the screw mounting to the wall is increased by the inclusion of the legs. Furthermore, the longer the legs the greater the risk that an impact force against the enclosure will loosen the fixing screw from the wall.

It is also the case that mounting the device with legs can prove difficult as each leg must be held in position whilst being installed. This often results in the installation process becoming a two-person job.

Preferred embodiments of the present invention seek to overcome or alleviate the above described disadvantages of the prior art.

BRIEF SUMMARY

According to an aspect of the present invention there is provided an enclosure for protecting electrical components, cables and the like, the enclosure comprising: a plurality of faces together defining a volume with an opening to provide access to said volume, one of said faces adapted to have a plurality of apertures formed therein for receiving fixing means for fixing said enclosure to a surface; a lid, in use, to close said opening; a plurality of spacer members extending between said apertured face and the surface, said spacer members having a bore extending therethrough and at least one first threaded portion extending from a surface of said spacer member which in use engages said apertured face; and respective caps each having second threaded portions for engaging said first threaded portions thereby closing said bore.

By providing an enclosure with a spacer having a first externally threaded portion, retaining members with a first internally threaded portion and a cap with a second internally threaded portion the advantage is provided that the inside of the enclosure is completely sealed. For example, if water were to get between the wall surface and the base of the spacer, for example if the wall surface is uneven, then water would be able to pass up through the space adjacent to the fixing screw but even if it was able to get past the fixing screw the cap prevents any water ingress into the enclosure. As a result, the highest standards of water ingress prevention are provided.

The enclosure may further comprise respective retaining members having third threaded portions for also engaging said first externally threaded portions when said first threaded portions extend through said apertures and for fixing said spacer members to said aperture face.

By including a retaining member which is a third threaded portion to engage the first threaded portion of the spacer member the advantage is provided that the spacer member is held in place during installation of the enclosure. This significantly simplifies the installation process and allows it to be carried out as a one-man operation.

The enclosure could also further comprise at least one first seal in use located between said spacer members and said apertured face.

Providing a seal between the spacer member and the apertured face further improves the waterproofing of the enclosure. This is particularly important where the apertures in the rear face of the enclosure are created during installation since the precise size of the apertures is outside of the manufacturers control.

The enclosure may also further comprise at least one second seal in use located between said cap and an end of said spacer member adjacent said first threaded.

Providing a second seal in the cap further reinforces the advantages set out above.

In a preferred embodiment the aperture face opposes said opening.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Preferred embodiments of the present invention will now be described, by way of example only, and not in any limitative sense with reference to the accompanying drawings in which.

DETAILED DESCRIPTION

The following description of the preferred embodiment(s) is merely exemplary in nature and is in no way intended to limit the invention, its application, or uses.

Figure 1:
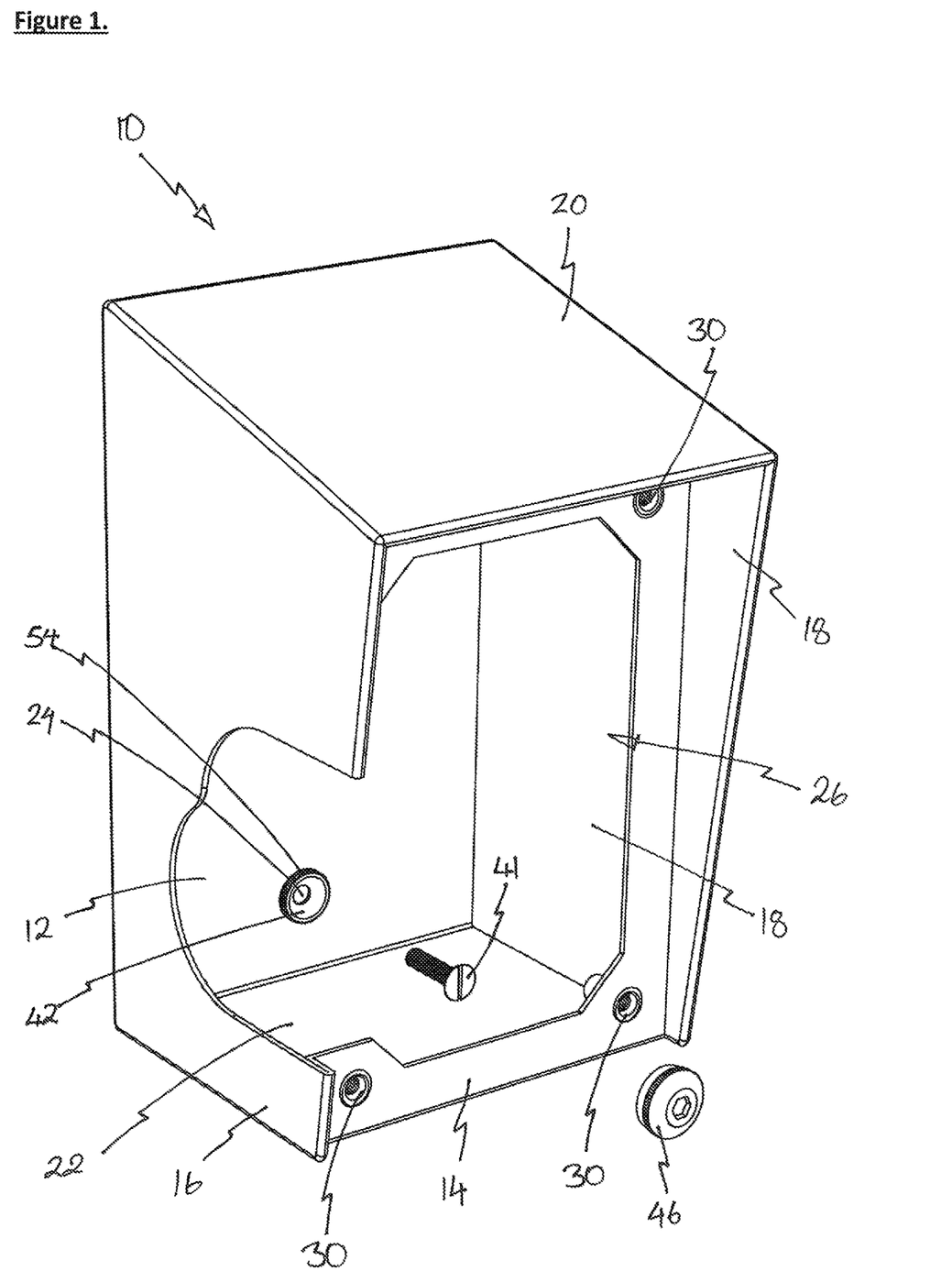
FIG. 1 is a perspective view of an enclosure of the present invention.
Figure 2:
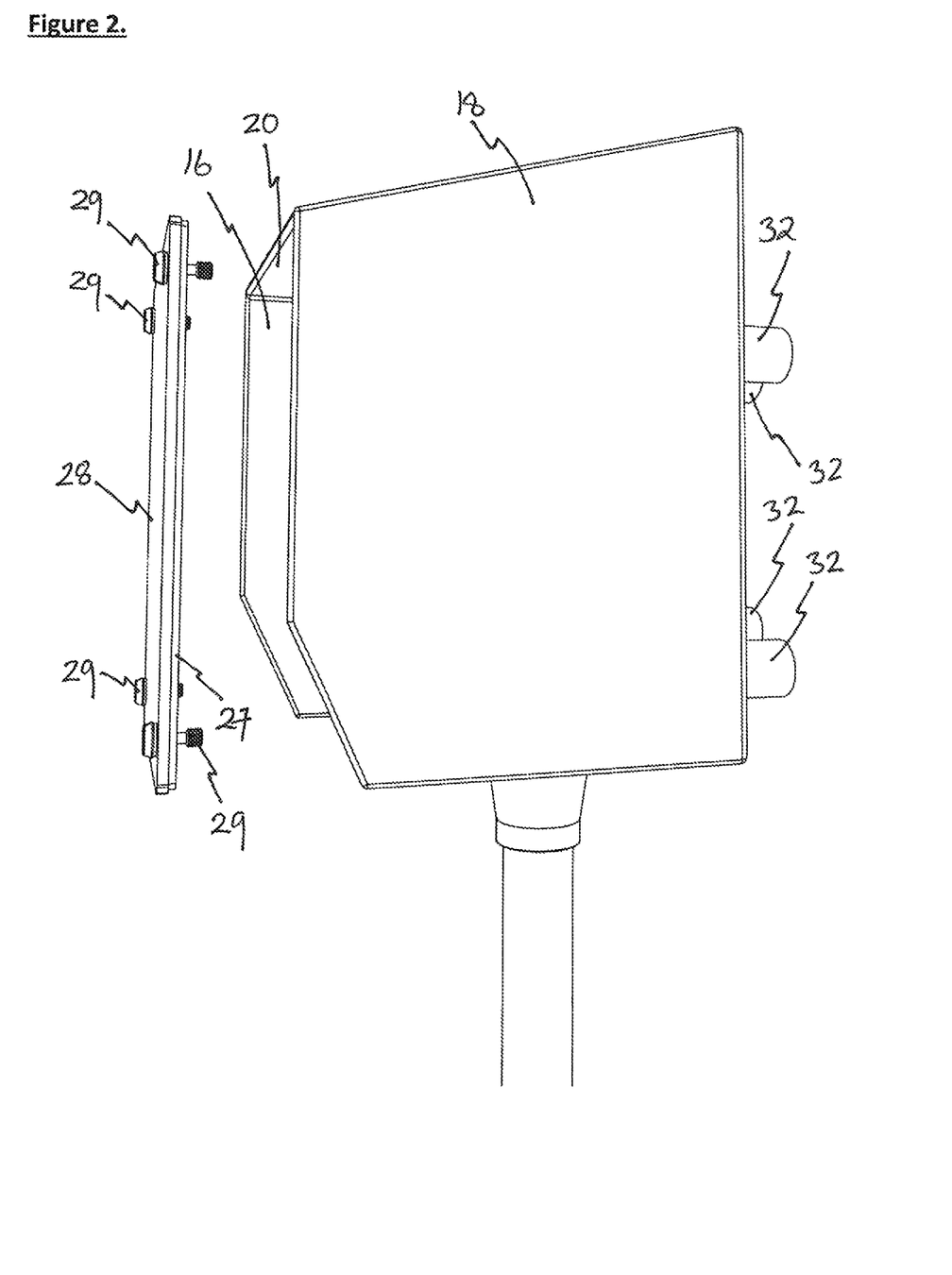
FIG. 2 is a perspective view of the enclosure of FIG. 1 from a different angle.
Figure 3:
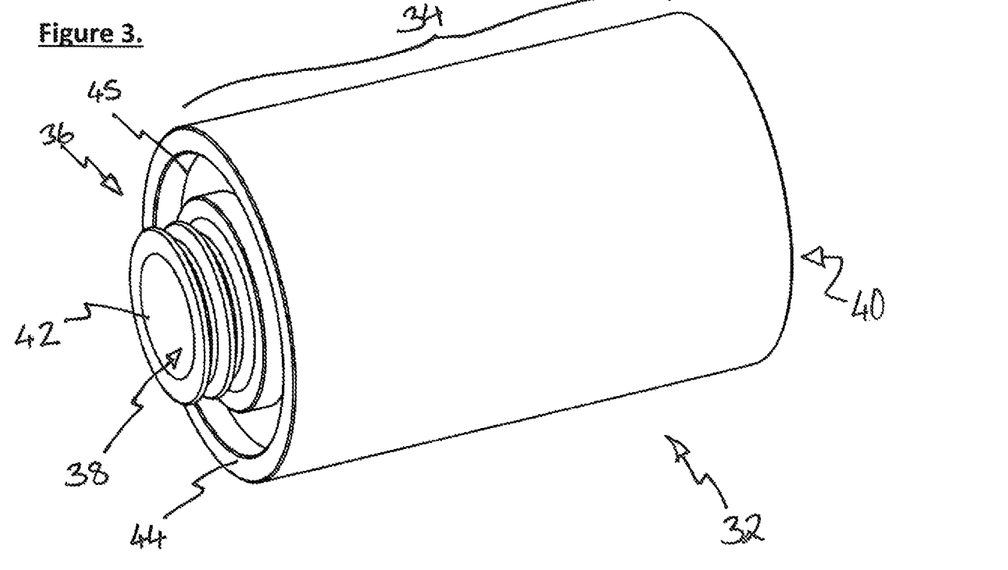
FIG. 3 is a perspective view of a component of the enclosure of FIGS. 1 and 2.

An enclosure 10 is shown in FIGS. 1 and 2 and some components are shown in more detail in FIGS. 3 to 6. The enclosure 10 is formed from a plurality, specifically six, stainless steel faces 12, 14, 16, 18, 20, 22 which together form an approximately cuboid shaped body and define a volume in which electrical components can be placed and/or into which electrical cables can be run (although none of these components or cables are shown in the figures). The rearmost face 12, which in use is located adjacent the surface onto which the enclosure will be mounted, is provided with a plurality of apertures (indicated at 24) which extend through this rear face of the cuboid. These apertures are either produced during manufacture of the enclosure or created by an installer on site as part of the installation process.

The face 14, which is on the opposing side of the cuboid to the apertured face 12, has an opening 26 which provides access to the volume of the cuboid created by the faces. A closure or lid 28 closes and seals the opening 26. The lid 28 is in the form of a rigid sheet of stainless steel and includes a seal 27 formed of neoprene, or any other suitable flexible seal material, which engages the edge of face 14 around the opening 26. The lid 28 is fixed to face 14 by four bolts 29 which engage respective blind threaded recesses 30 in each corner of the face 14. The uppermost face 20 is angled to slope downwards towards the front the enclosure and overhangs the front most face 14. This sloping ensures that any water on the outer surface of face 20 runs off that surface and the overhang prevents that water from running into the seal of lid 28. As a result of the sloping of face 20, the side faces 16 and 18 are not rectangular and also project forward of the face 14.

Figure 4:
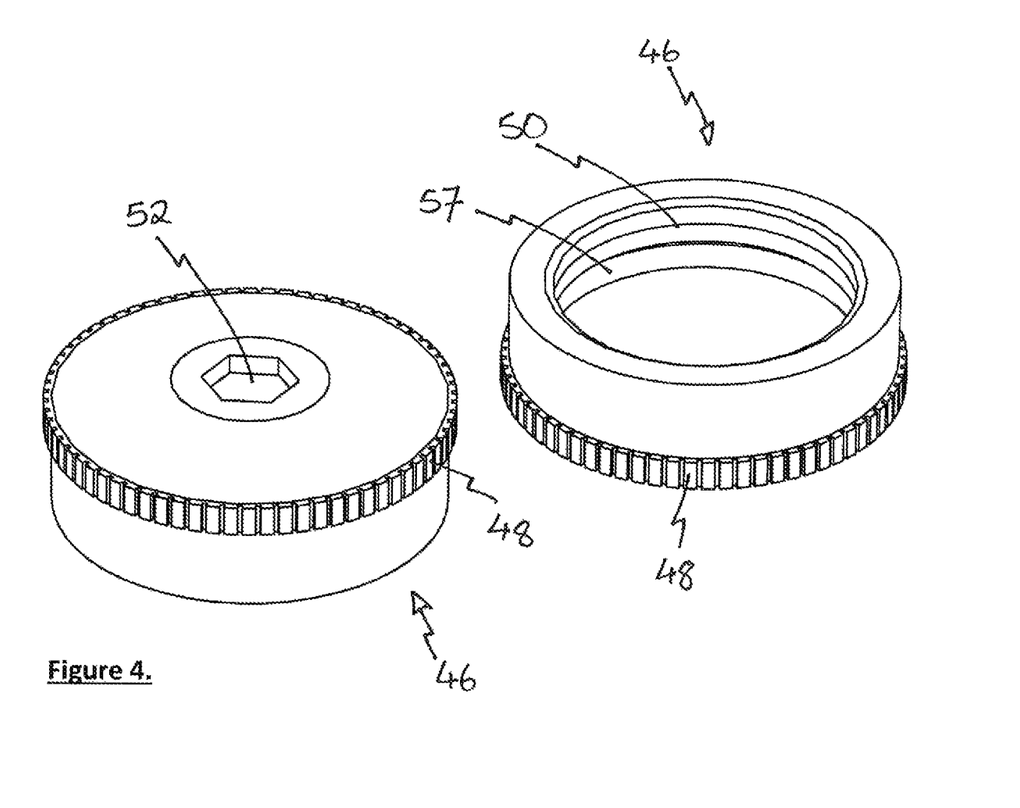
FIG. 4 includes two perspective views of another component of the enclosure of FIGS. 1 and 2 from above and below.
Figure 5:
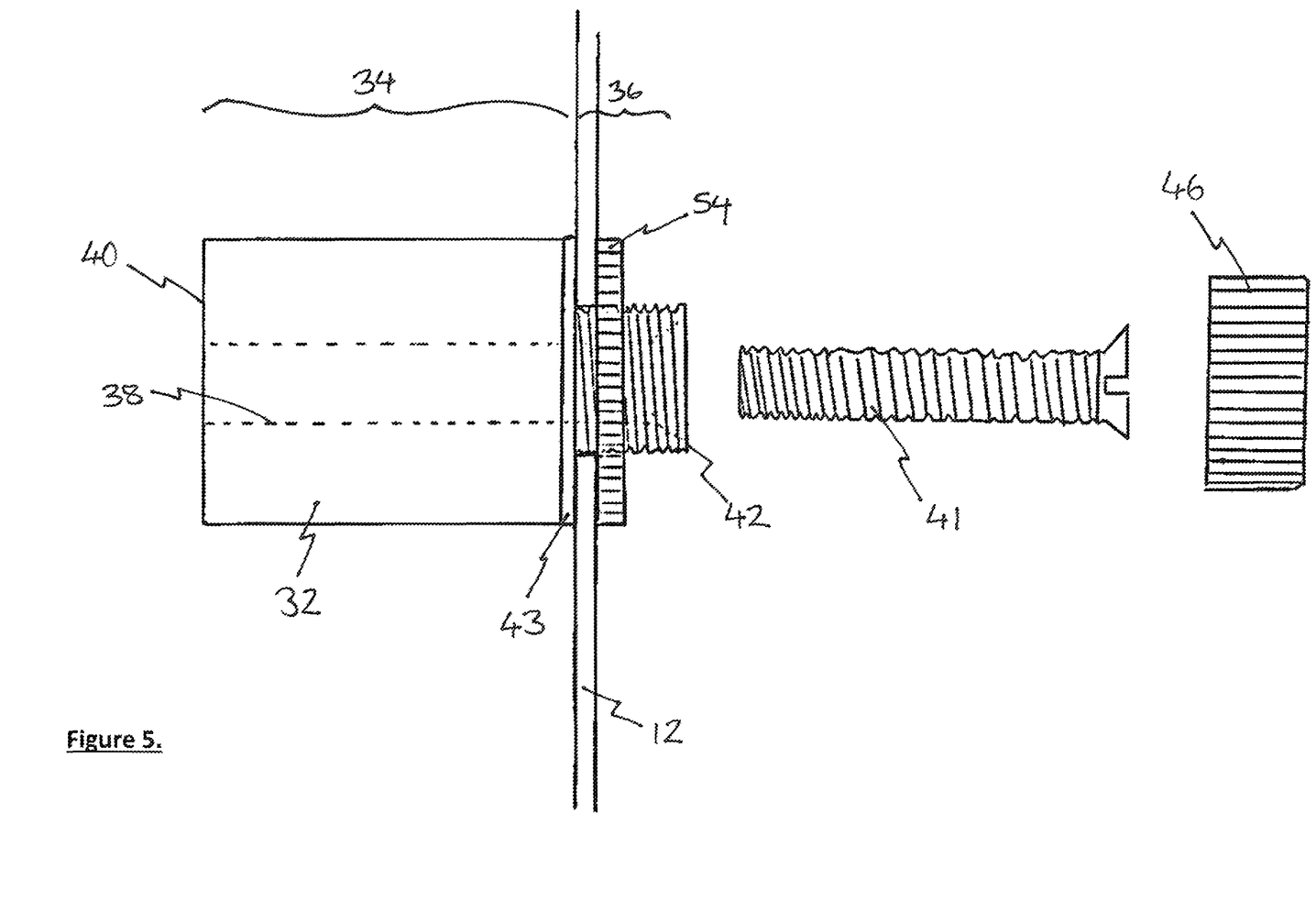
FIG. 5 is a side view of a portion of the enclosure of FIG. 1.
Figure 6:
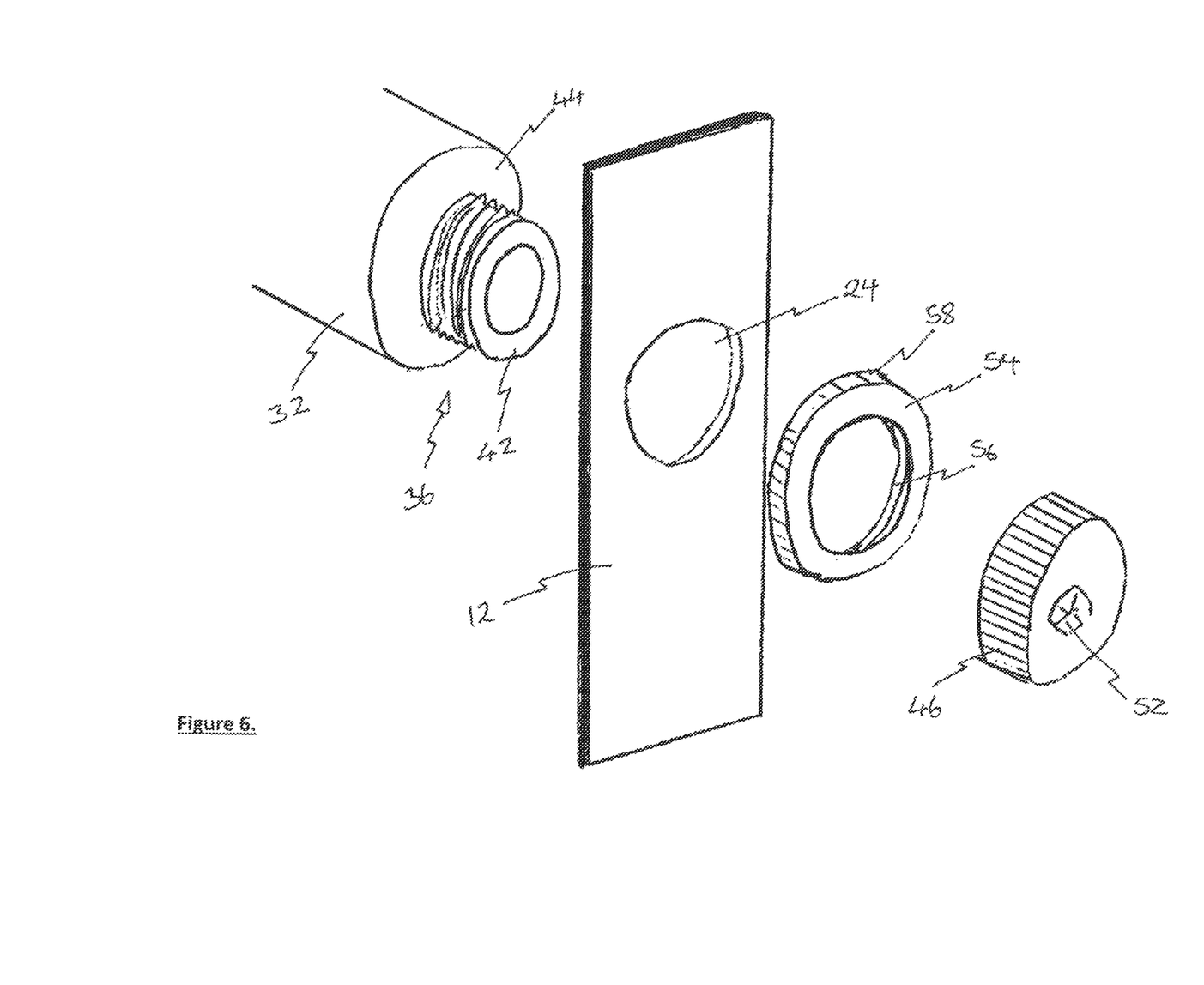
FIG. 6 is a perspective view of the components shown in FIG. 5.

In order to allow access to the rear surface of face 12 a plurality of spacer members 32 are provided which in use are located between the outer surface of the apertured face 12 and the surface, typically a wall, to which the enclosure 10 is fixed. Each spacer member 32 has a cylindrical body portion 34 and an externally threaded first portion 36 with a bore 38 extending through both the body and threaded portions. A first end 40 of the body portion 34 is located distal of the threaded portion 36 and in use engages the surface onto which the enclosure 10 is mounted. A second end 42 is located on the threaded portion 36 at the opposing end of the spacer 32 from the first end. This second end 42 has a chamfered surface to receive the conical underside of a chamfer headed fixing screw 41 (see FIG. 5). An intermediate portion 44 is formed because the diameter of the threaded portion 36 is smaller than the body portion 34 and it is preferable that a seal 43 is provided on or to engage the intermediate portion when it engages the outer surface of the apertured face 12. In the example of the spacer 32 shown in FIG. 3 a recess 45 is provided in the intermediate portion 44 to receive the seal 43. A further component of the enclosure 10 is a cap 46 one of which is provided for each of the spacer members 32 in order to seal them as they extend through the apertures 24. Detail of the cap 46 is shown in FIG. 4 and includes a knurled outer rim 48 which aids the initial engagement of the cap and allows cap to be hand tightened when it is first introduced. The cap 46 has a hollow underside with an internal second thread 50 which corresponds with the external first thread of threaded portion 34 of the spacer 32. A hexagonal recess 52 is provided in the upper surface of the cap 46 and is sized to receive an Allen key to ensure full tightening of the respective threads 50 and 34 when engaged.

To assist in the installation of the enclosure 10 a retaining member, in the form of a locking ring 54, is provided. This annular component includes an internal third thread 56 which engages the external first threaded portion 36 and knurled external edge 58. In addition to, or instead of, the seal 43 in the intermediate portion 44 of the spacer 32, a similar seal (not shown) can be provided on the surface annular of the locking ring 34 which in use is closest to the apertured wall 12.

Installation and operation of the enclosure 10 will now be described. The face 12 of enclosure 10 is either manufactured with apertures 24 formed therein or they are created by an installer as the first step of installation of the enclosure. The location of the apertures 24 in face 12 is then used to locate where holes should be drilled into the wall on which the enclosure is to be located. Once these holes have been created and the enclosure is ready to be fixed to the wall the spacers 32 are located against the outer surface of face 12 such that the intermediate portion 44 engages that outer surface, the threaded portion 36 extends through the apertures 24 and into the volume defined by each of the faces. To hold the spacers 32 in place, the locking rings 54 are fitted so that the external first thread and the internal third thread 56 are engaged and tightened until the seal 43 presses into engagement with the outer surface of the apertured face 12. Once all four spacers 32 are attached to the apertured face 12, the enclosure 10 is ready to be mounted on wall surface.

A fixing screw 41 (typically longer than that schematically represented in FIG. 1) is inserted through the bore 38 in spacer 32 (and therefore through the aperture 24) so that it extends into the hole drilled into the wall on which the enclosure is to be mounted. The fixing screw 41 is tightened so as to pull the enclosure 10 into engagement with the mounting wall.

Once all the fixing screws 41 are in place and the enclosure is securely fixed to the wall, the caps 46 can be used to cover the heads of the fixing screws 41 by engaging the internal thread 50 of the cap 46 with the external thread of the threaded portion 36 of spacer 32. An O-ring seal 57 located at the top of thread 50 ensures that the spacers and caps are sealed such that any water entering any of the bores 38 cannot pass therefrom. Further sealing of the enclosure is ensured by a seal located on intermediate portion 44 and the tightening of the cap 46 onto the threaded portion 36 presses the rear surface of face 12 into engagement with that seal which then prevents water from creeping past the intermediate portion 44 along the threaded portion 36 and into the enclosure. The seal in the recess 45 on intermediate portion 44 is not essential if the aperture 24, cap 46 and face 12 are formed with sufficient precision to ensure complete engagement between the components thereby creating the seal. However, it is more effective to include a rubberised compression seal of the type previously described. Once all of the caps 46 have been located the lid 28 can be fixed in position by inserting the fixing bolts into the threaded recesses 30 and the enclosure installation is complete.

It will be appreciated by persons skilled in the art that the above embodiments have been described by way of example only and not in any limitative sense, and that various alterations and modifications are possible without departure from the scope of the protection which is defined by the appended claims. For example, the length of the body portion 34 of spacer 32 can be anything suitable from a few millimetres to several centimetres. In the embodiment shown the opening 26 in face 14 is on the opposing side of the cuboid forming the main body of the enclosure from the apertured face 12. This need not always be the case if fixing in an alternative direction is required. However, it would make installation of the enclosure more complicated. Furthermore, the enclosure 10 can be any form of electrical enclosure including, but not limited to trunking which has open ends which connect together to form an elongate enclosure once installed.

It is also possible that the locking rings could be dispensed with and the caps 46 used to hold the main body of the enclosure to the spacers. In order to do this the thread 50 would be longer than that shown in FIG. 4 in order to ensure that the cap 46 can be threaded onto the threaded portion 36 of spacer 32 and apply a clamping force to the face 12 against the intermediate portion 44.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An enclosure for protecting electrical components, cables and the like, the enclosure comprising:
    a plurality of faces together defining a volume with an opening to provide access to said volume, one of said faces adapted to have a plurality of apertures formed therein to form an apertured face for receiving a fixing device for fixing said enclosure to a surface;
    a lid, in use, to close said opening;
    a plurality of spacer members extending between said apertured face and the surface, said spacer members having a bore extending therethrough and at least one first threaded portion extending from a surface of said spacer member which in use engages an external surface of said apertured face; and
    a plurality of caps each having a second threaded portion for engaging said first threaded portion of one of said spacer members thereby closing said bore; and
    a plurality of retaining members each having a third threaded portion for engaging said first threaded portion of one of said spacer members when said first threaded portion of said one of said spacer members extends through said aperture to fix said one of said spacer members to said apertured face.

2. An enclosure according to claim 1 wherein the first threaded portion of each of the spacer members extends through one of the apertures in the apertured face so that a portion of the first threaded portion extends into the volume, and wherein each of the retaining members and the caps are coupled to the portion of the first threaded portion of one of the spacer members which is located within the volume such that the retaining members and the caps are positioned entirely within the volume.

3. An enclosure according to claim 1, further comprising at least one first seal in use located between said spacer members and said apertured face.

4. An enclosure according to claim 1, further comprising at least one second seal in use located between each of said caps and an end of said spacer member adjacent said first threaded portion.

5. An enclosure according to claim 1, wherein said apertured face opposes said opening.

6. An enclosure according to claim 1, wherein each of said spacer members comprises a body portion having a first end and a second end and the at least one first threaded portion extending from the second end, wherein the first end of the body portion is configured to abut against the surface, the second end of the body portion is positioned adjacent to a rear surface of the apertured face, and the first threaded portion extends through one of the apertures and protrudes from a front surface of the apertured face and into the volume.

7. An enclosure according to claim 6 further comprising a seal positioned around the threaded portion of each of the spacer members adjacent to the second end of the body portion, and wherein the seal is compressed against the rear surface of the apertured face.

8. An enclosure according to claim 6 wherein the second end of the body portion comprises a recessed portion, and further comprising a seal positioned within the recessed portion.

9. An enclosure according to claim 6 wherein the first threaded portion extends from the second end of the body portion to a distal end, and wherein the distal end is chamfered to receive a conical underside of a fixing screw.

10. An enclosure according to claim 1 wherein the plurality of faces comprises the apertured face, a plurality of side faces extending from the apertured face to distal ends, and a front face which is opposite the apertured face and defines the opening into the volume.

11. An enclosure according to claim 10 wherein the front face comprises a plurality of blind holes, and wherein the lid is fixed to the front face by fasteners that extend through a thickness of the lid and into the blind holes in the front face.

12. An enclosure according to claim 10 wherein the plurality of side faces comprises an uppermost face that is angled to slope downwardly with distance from the rear face towards the front face.

13. An enclosure according to claim 10 wherein the plurality of side faces comprises an uppermost face, a first side face, a second side face, and a lowermost face, and wherein the uppermost face, the first side face, and the second side face protrude from the front face.

14. An enclosure according to claim 13 wherein a distance measured from the front face to the distal ends of the first and second side faces decreases with distance from the uppermost face towards the lowermost face along at least a portion of the first and second side faces.

15. An enclosure for protecting electrical components, the enclosure comprising:
   an enclosure body comprising a rear wall and one or more sidewalls extending from the rear wall to a distal end which defines an opening into a cavity;
   a plurality of apertures extending through the rear wall from a rear surface of the rear wall to a front surface of the rear wall;
   a plurality of spacer members each comprising a body portion having a first end which is configured to abut against a surface upon which the enclosure is to be mounted and a second end and a threaded portion extending from the second end and comprising an external threaded surface, a bore extending through each of the spacer members, wherein each of the spacer members is positioned so that the second end of the body portion is adjacent to the rear surface of the rear wall and the threaded portion extends through one of the apertures and protrudes from the front surface of the rear wall and into the cavity;
   a fixing screw inserted through the bore and into the surface to mount the enclosure to the surface; and
   a plurality of caps, each of the caps comprising an internal threaded surface which matingly engages the external threaded surface of the threaded portion of one of the spacers.

16. An enclosure for protecting electrical components, the enclosure comprising:
   an enclosure body comprising a rear wall and one or more sidewalls extending from the rear wall to a distal end which defines an opening into a cavity;
   a plurality of apertures extending through the rear wall from a rear surface of the rear wall to a front surface of the rear wall;
   a plurality of spacer members each comprising a body portion having a first end which is configured to abut against a surface upon which the enclosure is to be mounted and a second end and a threaded portion extending from the second end and comprising an external threaded surface, a bore extending through each of the spacer members, wherein each of the spacer members is positioned so that the second end of the body portion is adjacent to the rear surface of the rear wall and the threaded portion extends through one of the apertures and protrudes from the front surface of the rear wall and into the cavity;
   a plurality of retaining members, each of the retaining members comprising an internal threaded surface which matingly engages a first portion of the external threaded surface of the threaded portion of one of the spacer members so that a first end of each of the retaining members abuts against the front surface of the rear wall; and
   a plurality of caps, each of the caps comprising an internal threaded surface which matingly engages a second portion of the external threaded surface of the threaded portion of one of the spacers.

17. An enclosure according to claim 16 wherein the rear wall of the enclosure body is positioned between the second end of the body portion of the spacer members and the first end of the retaining members, and wherein the retaining members are positioned between the rear wall of the enclosure body and the caps.

18. An enclosure according to claim 16 further comprising a fixing screw inserted through the bore and into the surface to mount the enclosure to the surface.

19. An enclosure according to claim 18 wherein the threaded portion of each of the spacer members extends from the second end of the body portion to a distal end, and wherein the distal end of the threaded portion of each of the spacer members is chamfered to receive a conical underside of a head of the fixing screw.

20. An enclosure according to claim 16 further comprising a seal positioned around the threaded portion of each of the spacer members adjacent to the second end of the body portion, and wherein the seal is compressed against the rear surface of the rear wall of the enclosure body.

* * * * *